Feb. 1, 1944.   S. MIKAMI   2,340,548
SAFETY DEVICE FOR MACHINE TOOLS USING PHOTO-ELECTRIC TUBES
Filed Aug. 9, 1940

INVENTOR.
Shinkuro Mikami

Patented Feb. 1, 1944

2,340,548

UNITED STATES PATENT OFFICE 2,340,548

SAFETY DEVICE FOR MACHINE TOOLS USING PHOTOELECTRIC TUBES

Shinkuro Mikami, Tokyo, Japan; vested in the Alien Property Custodian

Application August 9, 1940, Serial No. 352,036

3 Claims. (Cl. 90—21)

My invention relates to improvements in a safety device for machine tools using photo-electric tubes for controlling the operation of driving motors and has for its object to provide a simple and positive safety device for protecting a machine tool by stopping the feeding operation immediately in case of accidents in a driving mechanism such as the slipping of the clutch due to an overload on the cutting tool.

In machine tools the feeding motion of a work can be stopped during the operation of a cutting tool without objection. It is however very dangerous if the feeding operation is not stopped when the cutting tool has been stopped. In order to avoid the danger the motor for driving the cutting tool and the motor for feeding the work to be machined are mechanically interconnected so that if one stops by some cause the other also is stopped. But the cutting tool is not directly connected to the shaft of the motor for driving the cutting tool, these usually being interposed gearings, friction clutches and the like power transmitting mechanism. Accordingly the mechanical interconnection of the driving motors can not perfectly protect the machine tools when the cutting tool is stopped due to the slip of the clutch mechanism or other causes occurred in the intermediate driving mechanism.

My invention is specially designed to stop the feeding operation of a machine tool easily and positively by using photo-electric tubes when the cutting tool is stopped owing to some causes in the driving gear itself.

Figure 1:
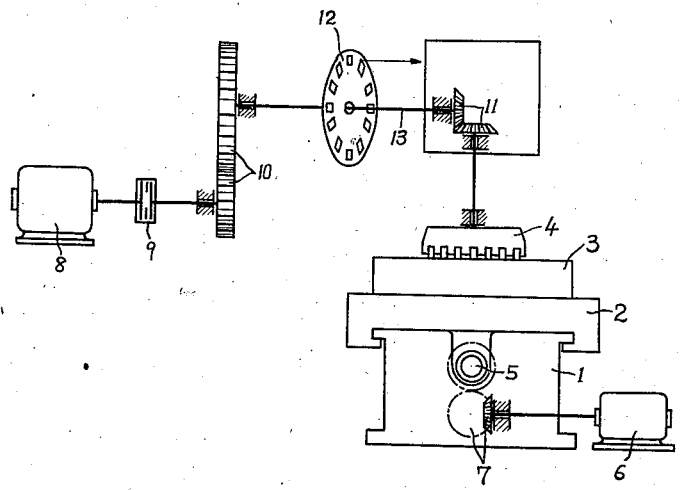
Figure 2:
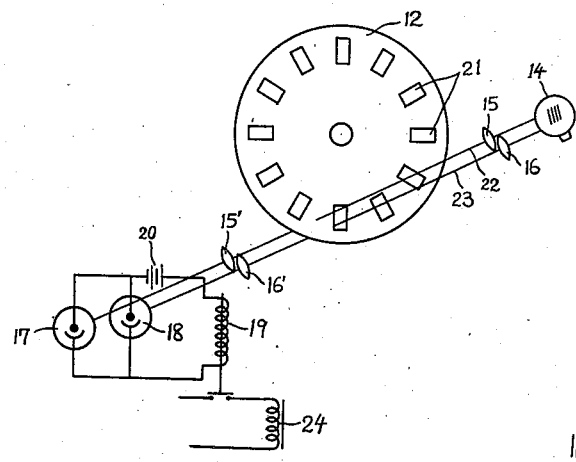

In the accompanying drawing, Fig. 1 is an elevation of a milling planer drawn diagrammatically combined with a device embodying my invention and Fig. 2 is a diagrammatic view of a photoelectric controlling device for use with the machine tool embodying my invention.

Referring to the drawing, 1 represents a base frame of the milling planer having a working table 2, on which a work 3 to be machined is fixed. 4 represents a cutting tool and 5 is a main screw shaft mounted on the machine frame 1 and meshing with a half-nut secured to the sliding table 2 and is driven by a motor 6 through suitable gear mechanism for effecting the feeding operation of the table. The cutting tool 4 is driven by a motor 8 through a friction clutch 9 and gear wheels 10 and 11.

According to my invention I provide a light interrupter 12, secured to a suitable shaft 13 in the driving mechanism between the friction clutch 9 and the cutting tool 4 to control the light beams projected from a light source 14 alternately through the lenses 15, 15' and 16, 16' to the photo-electric tubes 17 and 18 which cooperate to stop the feeding motor 6 by means of an electro-magnetic device 19 connected in the output circuit of the photo-electric tubes 17 and 18. 20 represents an energizing source of the photo-electric tubes. The interrupter 12 is provided with a number of slots 21 arranged on a circle at equal distances apart. The light beams projected through the lenses 15 and 16 from the light source 14 are passed through the successive slots 21 on the interrupter 12 when it is revolving and are focussed through the lenses 15' and 16' into the photo-electric tubes 17 and 18 alternately which then conduct electric currents in the output circuit of the photo-electric tubes and energize the relay 19 by the combined effect of both photo-electric tubes. The relay 19 is arranged to control a solenoid 24 which operates the main switch of the work feeding motor 6 to be stopped in case of accident. A plurality of photo-electric tubes 17 and 18 and the light source 14 should be so arranged with regard to the interrupter 12 that either one or both of the light beams 22 and 23 can not pass through the same or more slots 21 when the interrupter 12 is stationary.

In the above described arrangement of this invention, under the normal operation of the machine tool the photo-electric tubes 17 and 18 conduct sufficient current alternately within a very short time interval so that the relay 19 may be effectively energized to operate the solenoid 24 of the motor switch and maintain the motor 6 in operation. But if there occurs slip in the friction clutch 9 due to some failure in the driving mechanism of the cutting tool the disc 12 is retarded and at least one or all of the light beams 22 and 23 will be interrupted by the disc 12 so that sufficient current does not pass through the photo-electric devices 17 and 18 to energize the relay 19. Then the solenoid 24 is de-energized to open the circuit of the motor 6. Thus according to this invention the machine tool can be safely protected by stopping the feeding motor simply and positively when the cutting tool is retarded suddenly due to some failure in the driving mechanism.

I claim:

1. A safety device for machine tools using photo-electric tubes comprising in combination a light controlling disc secured to a part of the driving mechanism of the cutting tool to be rotated therewith, said disc having a number of slots arranged on a circle, a plurality of photoelectric tubes connected to operate electrically, a light source and optical devices to project light beams into said photo-electric tubes through the slot of said light controlling disc, a relay connected to the output circuit of said photo-electric tubes to be effectively energized by the cooperation thereof to control the operation of the work feeding motor of the machine tool, said light controlling disc being so designed and arranged that when one of the photo-electric tubes is fully illuminated another one is fully shadowed.

2. A safety device for machine tools as claimed in claim 1, having two photo-electric tubes connected in parallel circuits to cooperate with said light source and optical devices to project the light beam into said photo-electric tubes alternately, the light controlling disc being secured to a part of the driving mechanism of the cutting tool to rotate at a certain speed and having a number of circumferentially spaced slots arranged in such manner that when the disc is stationary only one light beam is projected to said photo-electric tubes from said light source through said optical devices.

3. The apparatus as claimed in claim 1 in which the driving mechanism of the cutting tool includes a friction clutch and the light controlling discs is mounted on said driving mechanism between said clutch and the tool.

SHINKURO MIKAMI.